(12) United States Patent
Kim et al.

(10) Patent No.: US 11,292,444 B2
(45) Date of Patent: Apr. 5, 2022

(54) PARKING BRAKE UNIT OF DOUBLE HINGE TYPE

(71) Applicant: DONGWOUN INDUSTRIAL CO., LTD., Ansan-si (KR)

(72) Inventors: Ho Jin Kim, Anyang-si (KR); Su Hyeon Han, Anyang-si (KR); Jung Woo Lee, Seoul-si (KR)

(73) Assignee: DONGWOUN INDUSTRIAL CO., LTD., Ansan-si (KR)

( * ) Notice: Subject to any disclaimer, the term of this patent is extended or adjusted under 35 U.S.C. 154(b) by 372 days.

(21) Appl. No.: 16/683,519

(22) Filed: Nov. 14, 2019

(65) Prior Publication Data

US 2020/0156609 A1    May 21, 2020

(30) Foreign Application Priority Data

Nov. 19, 2018    (KR) .......................... 10-2018-0142530

(51) Int. Cl.
*B60T 7/08* (2006.01)
*B60T 11/04* (2006.01)
*B60T 7/10* (2006.01)

(52) U.S. Cl.
CPC ............. *B60T 11/046* (2013.01); *B60T 7/102* (2013.01)

(58) Field of Classification Search
CPC ... B60T 7/08; B60T 7/10; B60T 7/102; B60T 11/04; B60T 11/046; F16D 2125/48; F16D 2125/60; F16D 2125/62; F16D 2125/64; Y10T 74/20396; Y10T 74/20402
See application file for complete search history.

(56) References Cited

U.S. PATENT DOCUMENTS

| 2009/0314122 | A1* | 12/2009 | Youn | ....................... B60T 7/108 74/501.5 R |
| 2012/0006143 | A1* | 1/2012 | Revelis | ..................... F16C 1/14 74/502.2 |

FOREIGN PATENT DOCUMENTS

| KR | 1020070035367 A | * | 3/2007 | ................ B60T 7/10 |
| KR | 1020100031331 A | * | 3/2010 | |

OTHER PUBLICATIONS

Machine translation of KR 1020070035367 (no date).*
Machine translation of KR 1020100031331 (no date).*

* cited by examiner

*Primary Examiner* — Nicholas J Lane
(74) *Attorney, Agent, or Firm* — Sughrue Mion, PLLC

(57) ABSTRACT

The present invention relates to a double hinge type parking brake device which is constituted by a plurality of connection members having each gear formed on an outer peripheral surface while excluding a connection cable connecting a parking brake lever and a parking cable operating shaft for operating a parking cable to maintain an initial installation state instead of stretching the connection cable when the connection cable is used for a long time, thereby facilitating post management.

4 Claims, 4 Drawing Sheets

PARKING BRAKE UNIT OF DOUBLE HINGE TYPE

TECHNICAL FIELD

The present invention relates to a double hinge type parking brake device and more particularly, to a double hinge type parking brake device which is constituted by a plurality of connection members having each gear formed on an outer peripheral surface while excluding a connection cable connecting a parking brake lever and a parking cable operating shaft for operating a parking cable to maintain an initial installation state instead of stretching the connection cable when the connection cable is used for a long time, thereby facilitating post management.

BACKGROUND ART

As everyone knows, in general, a vehicle has a hand brake or a side brake as a parking brake used when the vehicle is stopped or parked, in addition to a foot brake for stopping or decelerating the vehicle.

The parking brake performs a function of maintaining the vehicle in a stop state and serves to brake front wheels or rear wheels of the vehicle so as to maintain the parking state of the vehicle.

For example, the parking brake includes a brake drum, a shoe, a spring, etc. to brake the wheels of the vehicle by closely contacting the parking brake shoe to the parking brake drum.

Generally, as illustrated in FIG. 1, the parking brake device 10 is constituted by a lever mounting bracket 11 of which one end is fixed and installed to a floor panel of a driver's seat side, an operating lever 12 hinged to the other end of the lever mounting bracket 11 so that one end thereof is rotatable by a shaft, a rotational shaft bracket 13 of which one end is fixed and installed to the floor panel while being separated from a predetermined distance to face the lever mounting bracket 11, a rotational shaft 14 of which one end is connected to the lever mounting bracket 11 and the other end is shaft-rotatably coupled to the rotational shaft bracket 13, a rotational arm 17 of which one end is integrally coupled on the rotational shaft 14 and the other end is fixed and connectable to a cable rod 16 having an equalizer 15, an operating arm 18 of which one end is fixed on the rotational shaft 14 so as to be located at one side of the rotational arm 17 of which one end is fixed on the rotational shaft 14, and a connection cable 19 of which one end is fixed to the other end of the operating arm 18 and the other end is connected to the operating lever 12 to operate the cable rod 16 having the equalizer 15 by rotating the rotational shaft 14 so as to correspond to operating the operating lever 12.

However, a general parking brake device configured as such in the related art is constituted to rotate the rotational shaft while rotating the operating arm connected by the connection cable by operating, that is, rotating the operating level as described above and as a result, there is a disadvantage that the connection cable is stretched as the parking brake device is used for a long time.

DISCLOSURE

Technical Problem

Therefore, in order to solve the aforementioned problems, an object of the present invention is to provide a double hinge type parking brake device and more particularly, to a double hinge type parking brake device which is constituted by a plurality of connection members having each gear formed on an outer peripheral surface while excluding a connection cable connecting a parking brake lever and a parking cable operating shaft for operating a parking cable to maintain an initial installation state instead of stretching the connection cable when the connection cable is used for a long time, thereby facilitating post management.

Other objects of the present invention will be apparent as the description proceeds.

Technical Solution

In order to achieve the aforementioned objects, the present invention provides a double hinge type parking brake device comprising: a fixing bracket of which one end is fixed to a floor panel of a vehicle; a lever of which one end is rotatably installed on the other end of the fixing bracket by a driving shaft; a driving member which is located on an outer side surface of one end of the lever by fixing one end of the driving shaft through a central portion and has a driving gear formed on the outer peripheral surface; rotational force transfer member of which one end is fixed to one end of a rotational shaft transfer shaft installed rotatably on the fixing bracket so as to be located below the driving shaft and which has a rotational force transfer gear formed on an outer peripheral surface so as to gear-engage with the driving gear of the driving member; an operating shaft bracket which has one end fixable to the floor panel to be located at one side of the fixing bracket; an operating shaft of which one end and the other end are rotatably provided on the fixing bracket and the operating shaft bracket to be located below the rotational shaft transfer shaft; an operating member which is fixed and installed on the operating shaft and has an operating gear formed on the outer peripheral surface to engage with the rotational force transfer gear of the rotational force transfer member; and a cable guide which is located at one side of the operating member and fixed and installed on the operating shaft to fix a cable rod having an equalizer and to operate a cable correspondingly to operating the lever.

The driving gear gear-engaging with the rotational force transfer gear of the rotational force transfer member may be formed only as much as a radius of the rotation correspondingly to rotating the lever.

The rotational force transfer gear of the rotational force transfer member may include a first rotational transfer gear gear-engaging with the driving gear of the driving member and a second rotational transfer gear spaced apart from the first rotational transfer gear to gear-engage with the operating gear of the operating member.

Advantageous Effects

As described above, according to the double hinge type parking brake device of the present invention, it is possible to maintain an initial installation state, prevent a malfunction according to the parking brake operation to prevent accidents, and reduce costs according to post management.

MODES OF THE INVENTION

Figure 1:
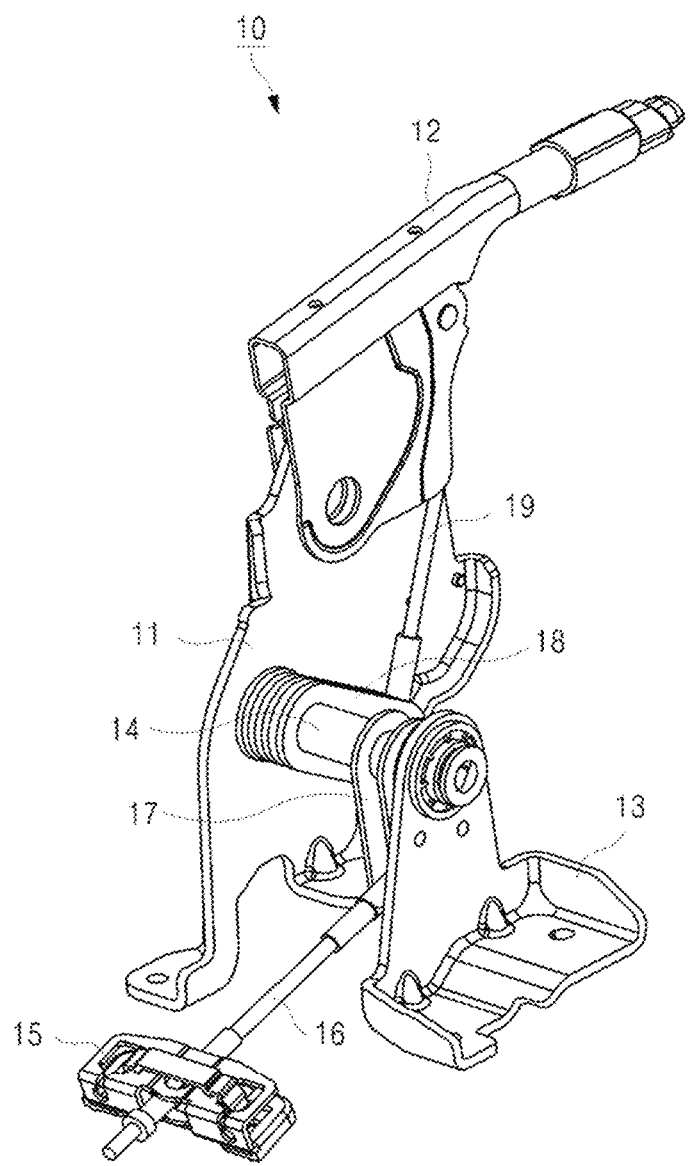
FIG. 1 is a perspective view illustrating a general parking brake device in the related art.

Hereinafter, an embodiment of a double hinge type parking brake device according to the present invention will be described in detail.

First, among drawings, it should be noted that same constituent elements or components are represented by the same reference numerals. In describing the present invention, a detailed description of known functions and configurations incorporated will be omitted so as to avoid obscuring the gist of the present invention.

As illustrated in the drawings, a double hinge type parking brake device 100 according to the present invention includes a fixing bracket 110 of which one end is fixed to a floor panel of a vehicle, a lever 130 of which one end is rotatably installed on the other end of the fixing bracket 110 by a driving shaft 120, a driving member 140 which is located on an outer side surface of one end of the lever by fixing one end of the driving shaft 120 through a central portion and has a driving gear 140a formed on the outer peripheral surface, a rotational force transfer member 160 which has one end fixed to one end of a rotational shaft transfer shaft 150 installed rotatably on the fixing bracket 110 so as to be located below the driving shaft 120 and has a rotational force transfer gear 160a formed on an outer peripheral surface so as to gear-engage with the driving gear 140a of the driving member 140, an operating shaft bracket 170 which has one end fixable to the floor panel to be located at one side of the fixing bracket 110, an operating shaft 180 of which one end and the other end are rotatably provided on the fixing bracket 110 and the operating shaft bracket 170 to be located below the rotational shaft transfer shaft 150, an operating member 190 which is fixed and installed on the operating shaft 180 and has an operating gear 190a formed on the outer peripheral surface to engage with the rotational force transfer gear 160a of the rotational force transfer member 160, and a cable guide 220 which is located at one side of the operating member 190 and fixed and installed on the operating shaft 180 to fix a cable rod 210 having an equalizer 200 and to operate a cable to correspond to operating the lever 120.

Hereinafter, the double hinge type parking brake device according to the present invention will be described below in more detail with reference to the accompanying drawings.

Figure 2:
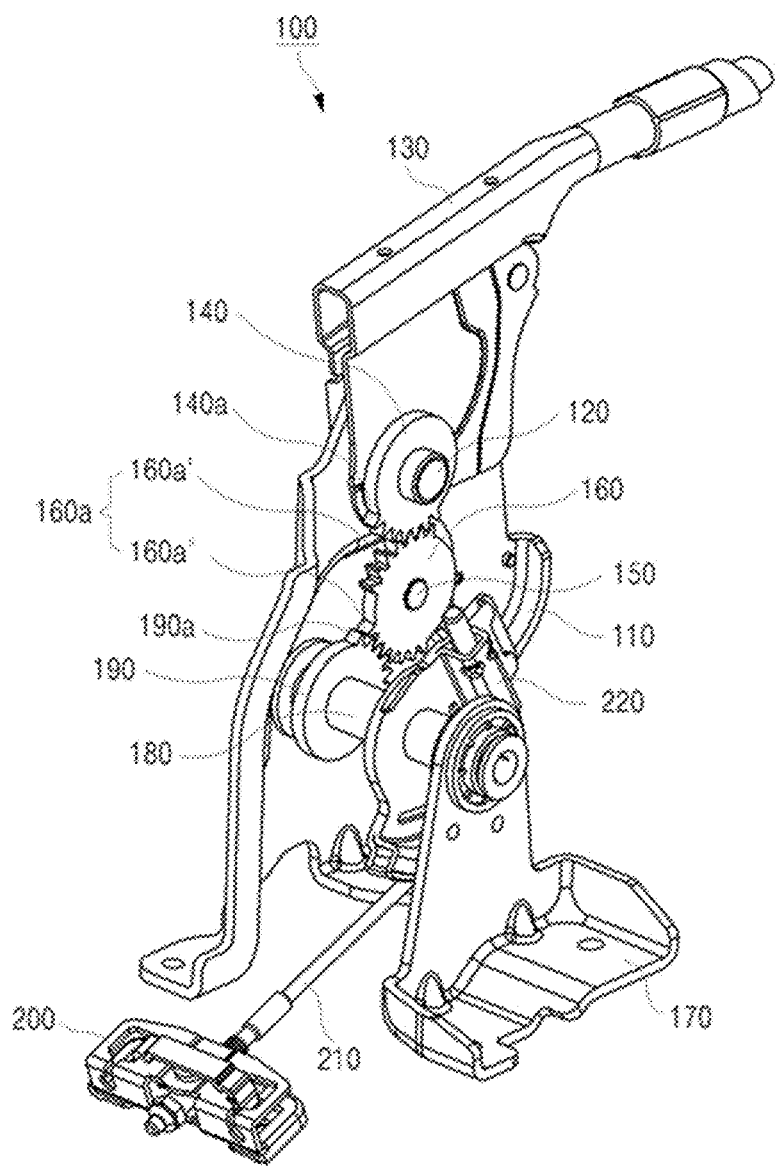
FIG. 2 is a perspective view illustrating a double hinge type parking brake device according to the present invention.
Figure 3:
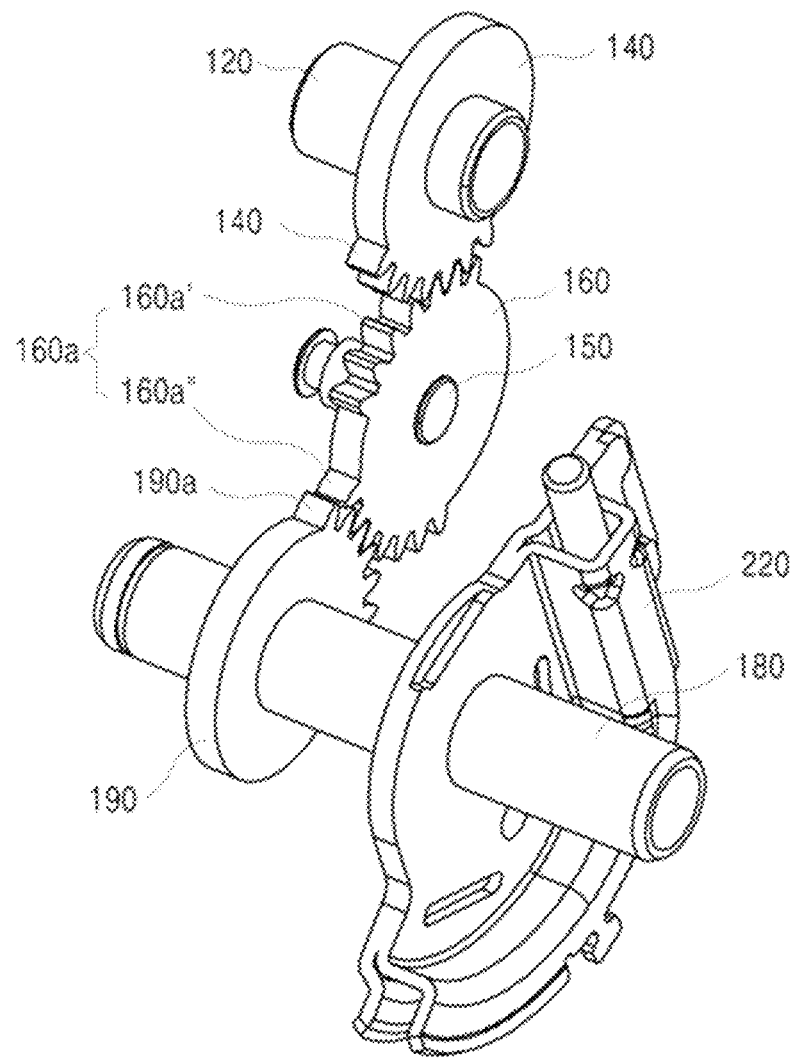
FIG. 3 is a perspective view illustrating a part of the double hinge type parking brake device according to the present invention.

First, as illustrated in FIGS. 2 and 3, in the double hinge type parking brake device 100 according to the present invention, the fixing bracket 110 is provided so that one end is fixed to the floor panel (not illustrated) of the vehicle and at the other end, the driving shaft 120, the rotational force transfer shaft 150, and the operating shaft 180 are rotatably installed so as to rotatably install the lever 130.

In other words, the fixing bracket 110 is formed in a plate shape, wherein one end has a fixing piece (reference numeral omitted) with a fixing hole (reference numeral omitted) so as to be fixed and installed on the floor panel of the vehicle and the other end has a plurality of holes (reference numeral omitted) so that the driving shaft 120, the rotational force transfer shaft 150, and the operating shaft 180 are rotatably installed.

The lever 130 is fixed to the driving shaft 120 by inserting the other end of the fixing bracket 110 into the inside of one end so as to operate the cable by rotating the other end, and the lever 130 is known and thus the detailed description will be omitted.

The driving member 140 is fixed and installed on the driving shaft 120 installed rotatably on the other end of the fixing bracket 110 to be located on an outer peripheral surface of one end of the lever 130 and gear-engages with the rotational force transfer gear 160a of the rotational force transfer member 160 on the outer peripheral surface to provide a rotational force.

In other words, the driving member 140 is fixed to one end of the driving shaft 120 through a central portion and formed in a circular plate having a fixing hole (reference numeral omitted) in the central portion be located on an outer peripheral surface of one end of the lever 120, and is provided to have the driving gear 140a formed on the outer peripheral surface to gear-engage with the rotational force transfer gear 160a of the rotational force transfer member 160.

At this time, as illustrated in FIGS. 2 and 3, the driving gear 140a is not formed on the entire outer peripheral surface, but formed on the outer peripheral surface of the driving member 140 only as much as the radius of rotation to correspond to the rotation of the lever 130 in order to reduce a weight and a material cost, As illustrated in FIGS. 2 and 3, the rotational force transfer member 160 gear-engages with the driving gear 140a while being rotatably installed below the driving member 140 to transfer the rotational force generated by operating the lever 130 to the operating member 190 side.

That is, the rotational force transfer member 160 is rotatably installed on the fixing bracket 110 and formed in a circular plate shape of which a hole (not illustrated) is perforated in the central portion so as to fix one end of the rotational force transfer shaft 150 located below the driving shaft 120 through the central portion, and has the rotational force transfer gear 160a formed on the outer peripheral surface so as to transfer the rotational force by gear-engaging even with the operating gear 190a of the operating member 190 while gear-engaging with the driving gear 140a of the driving member 140.

Here, like the driving gear 140a of the driving member 140, the rotational force transfer gear 160a of the rotational force transfer member 160 is not formed on the entire outer peripheral surface, but is constituted by a first rotational transfer gear 160a' gear-engaging with the driving gear 140a of the driving member 140 and a second rotational transfer gear 160a'' spaced apart from the first rotational transfer gear 160a' to gear-engage with the operating gear 190a of the operating member 190 in order to reduce the weight and the material cost.

The operating shaft 180 is located below the rotational force transfer shaft 150 to install the operating member 190 and provided rotatably so that one end passes through the fixing bracket 110 and the other end passes through the operating shaft bracket 170.

The operating member 190 is fixed and installed on the operating shaft 180 and has the operating gear 190 formed on the outer peripheral surface to engage with the rotational force transfer gear 160a of the rotational force transfer member 160.

That is, as illustrated in FIGS. 2 and 3, the operating member 190 is formed in a circular plate shape having an installation hole (not illustrated) perforated in the central portion to be fixed and installed on the operating shaft 180, and has the operating gear 190a formed on the outer peripheral surface to rotate the operating shaft 180 correspondingly to operating the lever 130 by gear-engaging with the second rotational force transfer gear 160a" of the rotational force transfer gear 160a of the rotational force transfer member 160.

Here, like the driving gear 140a of the driving member 140, the operating gear 190a of the operating member 190 is not formed on the entire outer peripheral surface, but formed only by a portion gear-engaging with the second rotational transfer gear 160a" of the rotational force transfer gear 160a of the rotational force transfer member 160 in order to reduce the weight and the material cost.

Meanwhile, the double hinge type parking brake device according to the present invention may be used by increasing the lever when using members having different diameters and gear ratios of the driving member 140, the rotational force transfer member 160, and the operating member 190 to be applied even to other vehicle types.

Further, the driving gear 140a, the rotational force transfer gear 160a, and the operating gear 190a formed on the driving member 140, the rotational force transfer member 160, and the operating member 190 are formed on a part of the outer peripheral surface, but are not limited thereto and may be formed on the entire outer peripheral surface.

Figure 4:
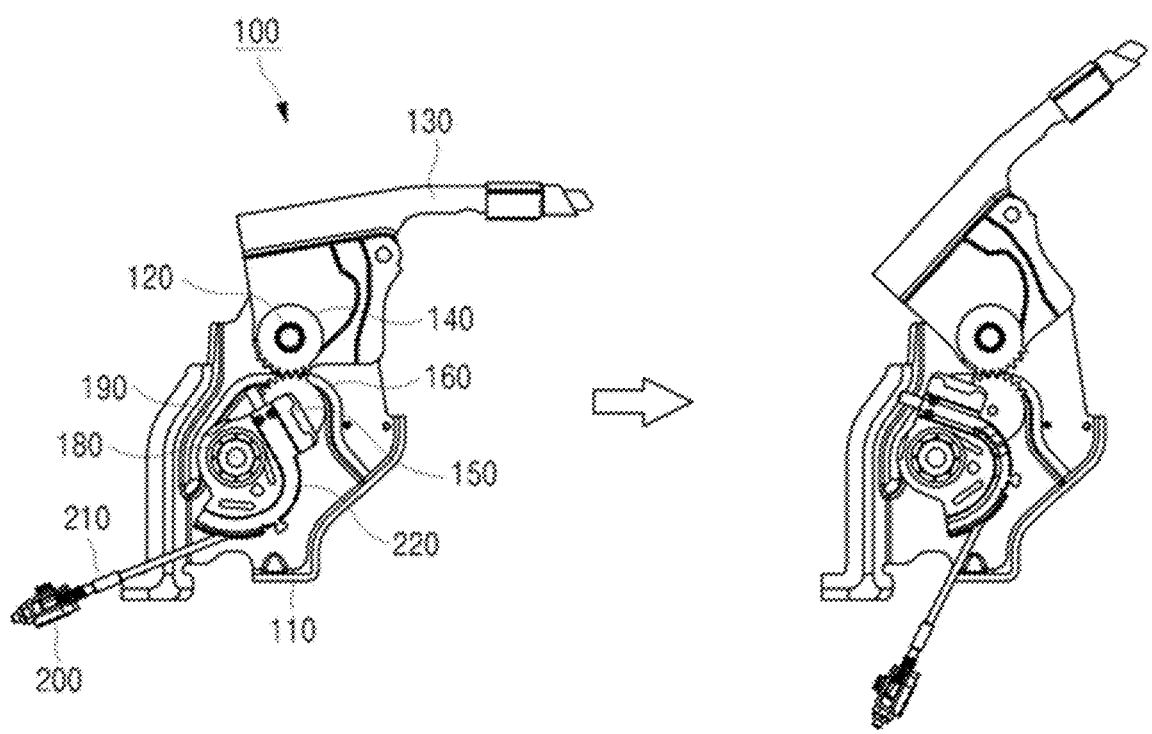
FIG. 4 is a diagram illustrating states before and after operating the double hinge type parking brake device according to the present invention.

When the parking brake to which the double hinge type parking brake device according to the present invention configured as such is operated, as illustrated in FIGS. 2 to 4, a driver gripes and then rotates the lever when the vehicle is stopped.

While the driving shaft 120 installed rotatably on the fixing bracket is rotated by rotating the lever, the driving member 140 fixed to the driving shaft 120 is rotated.

While the driving member 140 is rotated, the driving gear 140a of the driving member 140 and the first rotational force transfer gear 160a' of the rotational force transfer gear 160a of the rotational force transfer member 160 engage with each other to rotate the rotational force transfer member 160.

Furthermore, the second rotational force transfer gear 160a" and the operating gear 190a of the operating member 190 engage with each other by rotating the rotational force transfer member 160 to rotate the operating member 190.

The operating shaft 180 is rotated by rotating the operating member 190 and as a result, the cable guide 220 installed on the operating shaft 180 is rotated.

The cable fixed and connected through the cable rod 210 and the equalizer 200 is operated by rotating the cable guide 220 to brake the rear wheels, thereby maintaining the parking state of the vehicle.

As such, by operating the lever to maintain the parking state of the vehicle, the rotational force is transferred to the driving member 140, the rotational force transfer member 160, and the operating member 190 which gear-engage with each other. Accordingly, even if the parking brake device is used for a long time, the deformation is not made by a physical force to maintain an initial installation state, thereby preventing a malfunction according to the operation of the parking brake to prevent the accidents and reducing costs due to post management.

The above description just illustrates the technical spirit of the present invention and various changes and modifications can be made by those skilled in the art to which the present invention pertains without departing from an essential characteristic of the present invention. Therefore, the various embodiments disclosed in the present invention are not intended to limit the technical spirit but describe the present invention and the technical spirit of the present invention is not limited by the following embodiments. The protective scope of the present invention should be construed based on the appended claims, and all the technical spirits in the equivalent scope thereof should be construed as falling within the scope of the present invention.

| [Explanation of Reference Numerals and Symbols] | |
| --- | --- |
| 100: Double hinge type parking brake device | 110: Fixing bracket |
| 120: Driving shaft | 130: Lever |
| 140: Driving member | 150: Rotational force transfer shaft |
| 160: Rotational force transfer member | 170: Operating shaft bracket |
| 180: Operating shaft | 190: Operating member |
| 200: Equalizer | 210: Cable rod |
| 220: Cable guide | |

The invention claimed is:

1. A double hinge type parking brake device comprising:
   a fixing bracket of which one end is fixed to a floor panel of a vehicle;
   a lever of which one end is rotatably installed on the other end of the fixing bracket by a driving shaft;
   a driving member which is located on an outer side surface of one end of the lever by fixing one end of the driving shaft through a central portion and has a driving gear formed on the outer peripheral surface;
   a rotational force transfer member of which one end is fixed to one end of a rotational shaft transfer shaft installed rotatably on the fixing bracket so as to be located below the driving shaft and which has a rotational force transfer gear formed on an outer peripheral surface so as to gear-engage with the driving gear of the driving member;
   an operating shaft bracket which has one end fixable to the floor panel to be located at one side of the fixing bracket;
   an operating shaft of which one end and the other end are rotatably provided on the fixing bracket and the operating shaft bracket to be located below the rotational shaft transfer shaft;
   an operating member which is fixed and installed on the operating shaft and has an operating gear formed on the outer peripheral surface to engage with the rotational force transfer gear of the rotational force transfer member; and
   a cable guide which is located at one side of the operating member and fixed and installed on the operating shaft to fix a cable rod having an equalizer and to operate a cable correspondingly to operating the lever.

2. The double hinge type parking brake device of claim 1, wherein the driving gear gear-engaging with the rotational force transfer gear of the rotational force transfer member is formed only as much as a radius of the rotation correspondingly to rotating the lever.

3. The double hinge type parking brake device of claim 1, wherein the rotational force transfer gear of the rotational force transfer member includes a first rotational transfer gear gear-engaging with the driving gear of the driving member and a second rotational transfer gear spaced apart from the first rotational transfer gear to gear-engage with the operating gear of the operating member.

4. The double hinge type parking brake device of claim 2, wherein the rotational force transfer gear of the rotational force transfer member includes a first rotational transfer gear gear-engaging with the driving gear of the driving member and a second rotational transfer gear spaced apart from the first rotational transfer gear to gear-engage with the operating gear of the operating member.

\* \* \* \* \*